United States Patent
Yu

(10) Patent No.: US 7,227,663 B1
(45) Date of Patent: Jun. 5, 2007

(54) PRINTING AN ELECTRONIC DOCUMENT TO MULTIPLE OUTPUT MECHANISMS

(75) Inventor: Zhongming Yu, Redwood City, CA (US)

(73) Assignee: Ricoh Company Ltd., Tokyo (JP)

( * ) Notice: Subject to any disclaimer, the term of this patent is extended or adjusted under 35 U.S.C. 154(b) by 820 days.

(21) Appl. No.: 10/323,155

(22) Filed: Dec. 17, 2002

(51) Int. Cl.
*G06F 3/12* (2006.01)

(52) U.S. Cl. ............... 358/1.15; 358/1.9; 358/1.13; 710/8; 710/14; 710/62; 382/303; 382/304

(58) Field of Classification Search ............... 358/1.15, 358/1.9, 1.13; 710/8, 14, 62; 382/303, 304
See application file for complete search history.

(56) References Cited

U.S. PATENT DOCUMENTS 6,509,974 B1 * 1/2003 Hansen ............... 358/1.12
6,985,245 B1 * 1/2006 Takahashi ............... 358/1.15
2003/0011812 A1 * 1/2003 Sesek et al. ............... 358/1.15

* cited by examiner

*Primary Examiner*—Aung Moe
*Assistant Examiner*—Jacob P. Rohwer
(74) *Attorney, Agent, or Firm*—Hickman Palermo Truong & Becker LLP; Edward A. Becker

(57) ABSTRACT

A manner of specifying a document to be printed to multiple output mechanisms, including multiple printers and multiple output bins of each printer. Print specification data is received for an electronic document that is desired to be printed. The print specification data specifies two or more output mechanisms. An output mechanism is any potential entity that may be identified to receive one or more printed copies of electronic documents. Non-limiting, illustrative examples of output mechanisms includes the output bin of a single bin printer, a particular output bin of a multiple bin printer, or the output bin of a fax machine. Each of the two or more output mechanisms receives at least one printed copy of the electronic document. Thereafter, the print specification data is processed to initiate printing of the electronic document to the two or more output mechanisms.

40 Claims, 6 Drawing Sheets

PRINTING AN ELECTRONIC DOCUMENT TO MULTIPLE OUTPUT MECHANISMS

FIELD OF THE INVENTION

The present invention generally relates to the field of publishing, and more particularly, to printing an electronic document to multiple output mechanisms.

BACKGROUND OF THE INVENTION

The use of documents in an electronic format (electronic documents) has become increasingly popular for a variety of reasons. First, electronic documents provide a convenient format for storing information because electronic documents may be easily shared with others and do not degrade over time. Second, the type of documents that may be stored electronically has grown with the expanding field of software applications. Third, documents stored electronically lend themselves to be stored more cheaply and efficiently in the aggregate than traditional physical storage.

It remains advantageous, however, to obtain physical copies of electronic documents. For example, physically documents allow the documents to exist independently from an electronic medium. Thus, in situations where a computerized display is either inconvenient or unavailable, there is no substitute for having the physical document at hand. Also, many people prefer to minimize the amount of time spent reviewing electronic documents on computerized displays for purposes of reducing eyestrain.

Electronic documents are typically printed by issuing a print command to a printer driver in a software application responsible for rendering the electronic document. A printer driver acts like a translator between a printer and the programming entities interacting with the printer. For example, a printer driver accepts generic commands from the software application and translates the generic commands into specialized commands understood by the printer to enable to printer to print the electronic document. A portion of the generic commands that a printer driver may accept from the software application may include receiving print specification data, which is data that indicates how the electronic document is desired to be printed by a user.

Printers, which are devices that are capable of printing physical copies of electronic documents, may either have a single output bin or multiple output bins. An output bin is a tray coupled to a printer that collects documents printed by the printer. While printers with one output bin are common, a printer with multiple output bins may be advantageous when the printer services numerous clients or otherwise prints a large volume of electronic documents. A client is any computerized device that is capable of issuing a print command through a software application.

Software applications, with the assistance of a printer driver, may be used to specify a particular printer to print an electronic document. For example, a user that issues a print command through the software application may instruct a printer driver to print an electronic document using print specification data that specifies a particular printer to print the document. The print specification data may also include a particular output bin on a particular printer to receive the printed documents. However, while an electronic document may be printed to a particular bin in a multiple output bin printer, the current approaches fail to support printing an electronic document to multiple printers or to multiple output bins on a single printer with a single print command.

A variety of disparate people may have need to access printed physical copies of the same electronic document, and they may not be physically located in close proximity to each other. For example, people in different departments within a company may wish to review the same physical document, but each department may be located in a different building.

Current approaches attempt to address these problems by allowing users to issue multiple print commands through software applications, i.e., manually printing a first set of copies to a first destination, and subsequently manually printing a second set of copies to a second destination. For each print command issued, the user is required to submit a new set of print specification data. This results in wasted time and frustration for the user. By increasing the redundancy of the printing process, there is also an increased chance of mistake, as the user may submit an incorrect or unintended set of printing specifications due to a typographical error or the user being unsure of what set of printing specifications have already been submitted. Accordingly, there is an unaddressed need in the art to provide copies of electronic documents to multiple output mechanisms while avoiding the problems associated with issuing multiple print commands through software applications.

SUMMARY OF THE INVENTION

According to one aspect of the invention, an approach is provided for printing an electronic document to multiple output mechanisms. According to the approach, print specification data is received for an electronic document that is desired to be printed. The print specification data specifies two or more output mechanisms to each receive at least one printed copy of the electronic document. An output mechanism is any potential entity that may be identified to receive or produce one or more printed copies of electronic documents. Non-limiting, illustrative examples of output mechanisms include the output bin of a single bin printer, a particular output bin of a multiple bin printer, and the output bin of a fax machine. Thereafter, the print specification data is processed to initiate printing of the electronic document to the two or more output mechanisms.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and mechanism for printing an electronic document to multiple output mechanisms is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Various aspects of the invention are described hereinafter in the following sections:

I. Architecture Overview
II. Functional Overview
III. Printing an Electronic Document to Multiple Output Mechanisms
IV. Implementing Mechanisms

I. Architecture Overview

Figure 1:
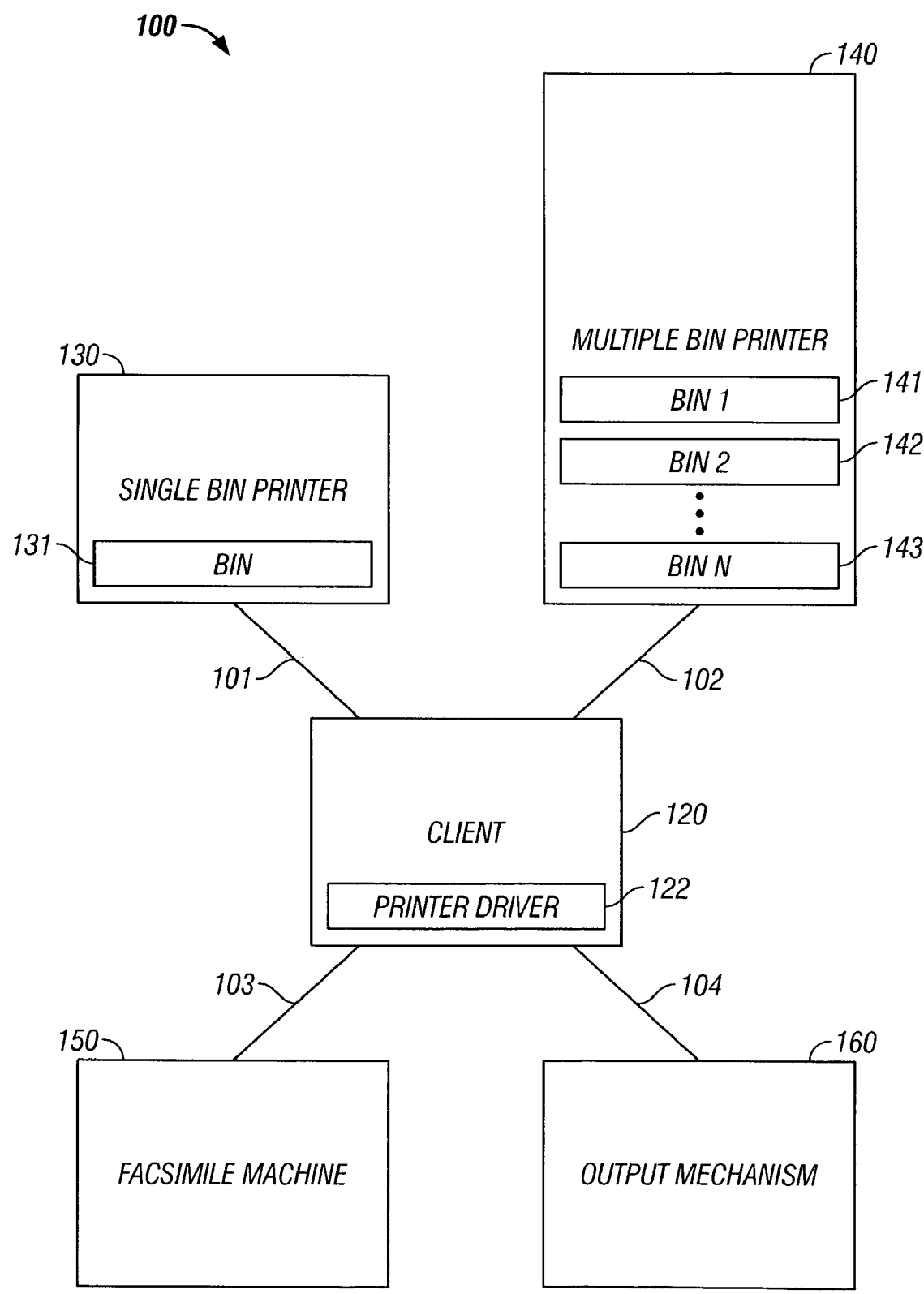
FIG. 1 is a block network diagram that depicts a printing system according to an embodiment of the invention.

FIG. 1 is a block network diagram illustrating a printing system 100 according to an embodiment of the invention. The printing system 100 of FIG. 1 includes communications links 101, 102, 103, and 104, a client 120, a single bin printer 130, a multiple bin printer 140, a facsimile machine 150, and an output mechanism 160.

Communications links 101–104 may be implemented by any medium or mechanism that provides for the exchange of data between client 120, single bin printer 130, multiple bin printer 140, facsimile machine 150, and output mechanism 160. Examples of communications links 101, 102, 103, and 104 include, without limitation, a network such as a Local Area Network (LAN), Wide Area Network (WAN), Ethernet or the Internet, or one or more terrestrial, satellite or wireless links.

Client 120 may be implemented by any computerized device or program that is capable of issuing a print command. Client 120 may comprise a printer driver 122. Printer driver 122 is a computerized device or program that may issue a command to output mechanism 160. Single bin printer 130 is a device that is capable of printing physical copies of electronic documents to a single output bin 131. Output bin 131 is a receptacle for collecting copies of documents printed from single bin printer 130. Multiple bin printer 140 is a device that is capable of printing physical copies of electronic documents to output bins 141, 142, 143. Output bins 141, 142, and 143 are each receptacles for collecting documents printed by multiple bin printer 140. Facsimile machine 150 refers broadly to any facsimile machine capable of printing, from electronic signals, fixed graphic material, including pictures, text, or images.

Output mechanism 160, as used herein, is broadly used to describe any potential entity that may receive one or more printed copies of electronic documents. Non-limiting, illustrative examples of output mechanism 160 include output bin 131 of single bin printer 130, output bins 141, 142, and 143 of multiple bin printer 140, and the output bin of a facsimile machine 150. Output mechanism 160 also includes entities that print copies of electronic documents to a single receptacle for printed documents. In other words, since there is only one printed document receptacle to receive printed documents from a printing device, reference to either the printing device or the printed document receptacle implicitly identifies the other. For example, in FIG. 1, single bin printer 130 and the facsimile machine 150 may each be an output mechanism 160.

In other embodiments of the invention, the printing system 100 comprises only a client 120 and an output mechanism 160. As client 120 may be operatively connected to any number of output mechanisms 160 via a communications link, embodiments of the invention are not limited to any particular number or arrangement of output mechanisms 160 within printing system 100. In an embodiment, client 120 and output mechanism 160 may be implemented upon the same computer system. In other embodiments, such as the one depicted in FIG. 1, client 120 and each output mechanism 160 may be implemented upon different computer systems.

II. Functional Overview

Figures 2A, 2B:
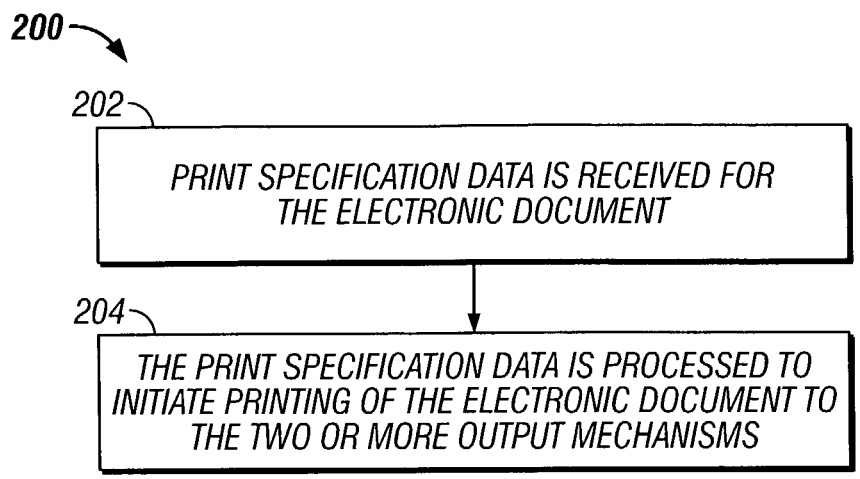
FIG. 2A is a flow-chart that depicts the high-level functional steps of printing an electronic document to multiple output mechanisms according to an embodiment of the invention.
FIG. 2B is a flow-chart that depicts the steps of printing an electronic document to multiple output mechanisms according to an embodiment of the invention.

FIG. 2A is a flow-chart that depicts the high-level functional steps of printing an electronic document to multiple output mechanisms according to an embodiment of the invention. In step 202, print specification data is received for the electronic document. The print specification data specifies that two or more output mechanisms are to each receive at least one printed copy of the electronic document. In step 204, the print specification data is processed to initiate printing of the electronic document to the two or more output mechanisms.

III. Printing an Electronic Document to Multiple Output Mechanisms

The printing of an electronic document to multiple output mechanisms is now be described in further detail with reference to flow-chart 210 of FIG. 2B. In step 212, a print command to print an electronic document is received. A print command is any command capable of being issued through client 120 that indicates that a user wishes to print one or more copies of an electronic document. In an embodiment, the print command is initiated at client 120 through a software application responsible for rendering the electronic document that is executing on client 120. For example, if the user of client 120 is working in a text editor, the user may click on an icon of a printer displayed within the text editor to issue a print command indicating that the user desires the electronic document to be printed.

It is not necessary to display an electronic document to initiate a print command. In an embodiment, the print command received in step 212 is initiated in an environment where the electronic document is not currently being rendered. For example, a file manager, or other such software program, responsible for managing the storage of the electronic document may issue the print command without rendering the electronic document.

Any processing entity may receive the print command in step 212. For purposes of explanation, embodiments of the invention are described below with reference to printer driver 122 receiving and processing the print command. However, the functional steps of FIG. 2B that are performed by printer driver 122 may be performed by other software entities or hardware components. For example, a separate software entity may be responsible for each step illustrated in FIG. 2B. Accordingly, embodiments of the invention are not limited to the presence or use of a printer driver to perform any action or step depicted in FIG. 2B.

After the print command is received, a graphical user interface is displayed on client 120 in step 214. The graphical user interface is a mechanism by which print specification data may be recorded. Print specification data is data that indicates how an electronic document is to be printed. In an embodiment, the software application responsible for rendering the electronic document displays the graphical user interface. In another embodiment, printer driver 122 receiving the print command in step 212 displays the graphical user interface. In yet another embodiment, printer driver 122 and the software application responsible for rendering the electronic document are jointly responsible for rendering the graphical user interface. For example, in such an embodiment, the software application may be responsible for rendering the graphical user interface, but may contact printer driver 122 to obtain information on how to render certain portions of the graphical user interface.

Figure 3A:
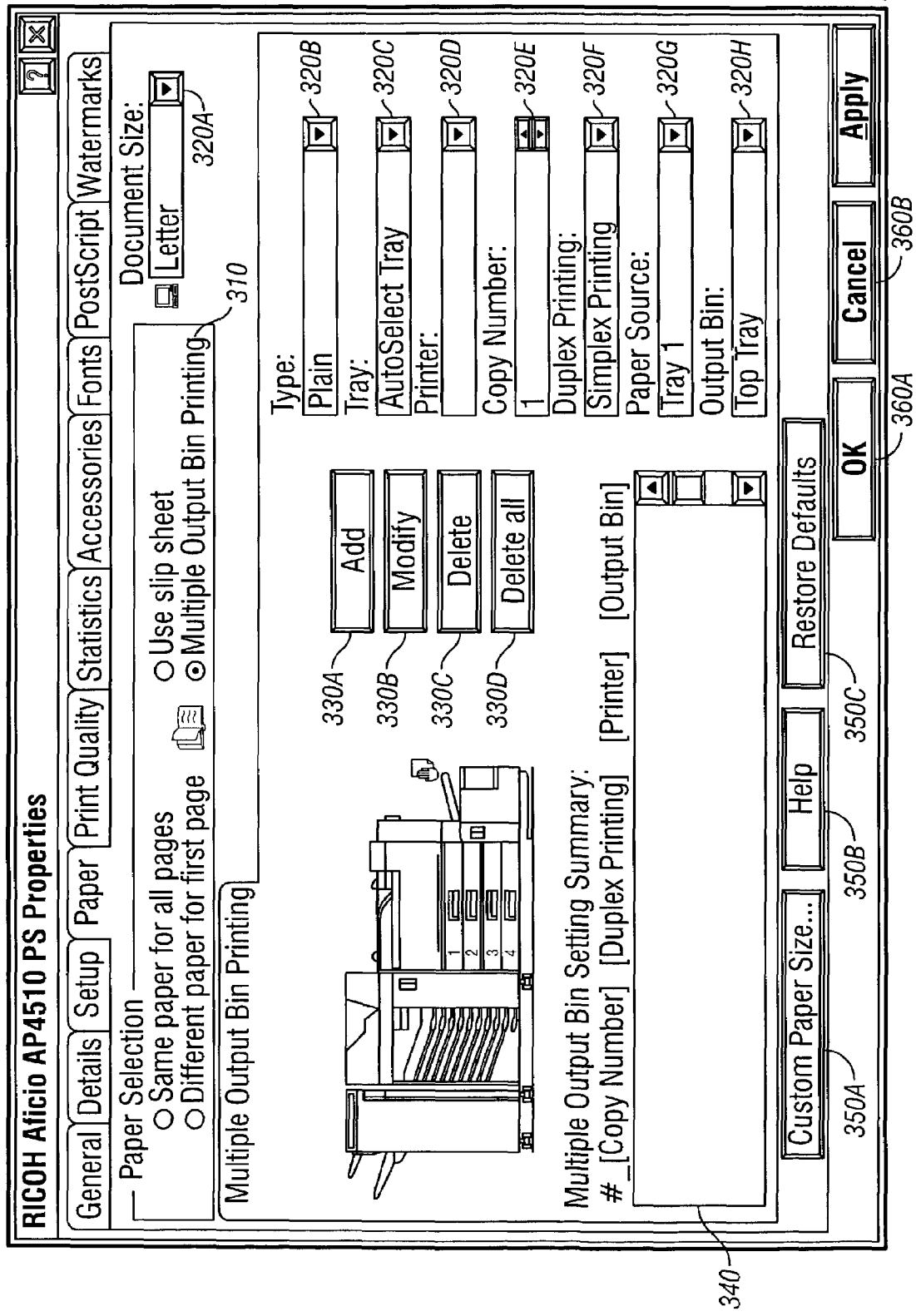
FIG. 3A is a first graphical illustration of a graphical user interface according to an embodiment of the invention.

FIG. 3A is a graphical illustration of a graphical user interface 300 according to an embodiment of the invention. Graphical user interface 300 includes user interface objects that allow a user to configure print specification data. In an embodiment, the set of user interface objects includes a multiple output mechanism printing selector 310, configuration inputs 320A–320H, command keys 330A–330D, a summary window 340, operation keys 350A–350C, and action keys 360A–360B.

In an embodiment, multiple output mechanism printing selector 310 is an object on graphical user interface 300 that may be configured by a user to display settings on graphical user interface 300 to allow the user to print multiple copies of an electronic document to multiple output mechanisms. In an embodiment, the multiple output mechanism printing selector 310 is a radio button that may be configured to display settings on the graphical user interface 300 to allow the user to print to multiple output mechanisms 160. For example, by selecting the multiple output mechanism printing selector 310, configuration inputs 320A–320H, command keys 330A–330D, summary window 340, and operation keys 350A–350C are displayed on the graphical user interface 300.

Configuration inputs 320A–320H allow a user to configure and record print specification data. In other words, configuration inputs 320A–320H allow a user to specify how an electronic document is to be printed. Print specification data may be configured using configuration inputs 320A–320H in any number of ways; configuration inputs 320A–320H shown in FIG. 3A are merely illustrative of one embodiment, as other embodiments of the invention may provide for print specification data to be configured using configuration inputs not shown in FIG. 3A, e.g., color of ink or stapling.

As illustrated in FIG. 3A, document size configuration input 320A provides a mechanism by which the document size of a desired printed copy may be configured. Document type configuration input 320B provides a mechanism by which the document type of a desired printed copy may be configured. Printer configuration input 320C provides a mechanism by which a desired printer to print one or more printed copies of the electronic document may be selected. Printer selector configuration input 320D provides a mechanism by which the particular printer to print one or more copies of an electronic document may be specified. Copy number configuration input 320E provides a mechanism by which the desired number of printed copies of an electronic document may be configured. Duplex configuration input 320F provides a mechanism in which simplex or duplex printing may be selected. Paper source configuration input 320G provides a mechanism by which a desired paper source of printed copies may be configured. Output bin configuration input 320H provides a mechanism by which the desired output bin of output mechanism 160 may be configured.

Configuration inputs 320A–320H may be used to specify print specification data for one or more print jobs. A print job is a discrete printing operation that causes one or more copies of an electronic document to be printed in a certain manner. Once the print specification data for a particular print job is configured, e.g., by specifying the desired print specification data using in the configuration inputs 320A–320H, the print job may be saved in a pending state, which allows the user to specify other print jobs through graphical user interface 300.

In an embodiment, print specification data may be saved as a print job in a pending state by listing the print job in summary window 340 using a add command key 330A. Summary window 340 is a mechanism that displays each pending print job specified by the graphical user interface 300. The summary window 340 may also display print specification data associated with each pending print job. In some embodiments, summary window 340 may display all print specification data associated with each pending print job, while in other embodiments, summary window 340 may only display of portion of the print specification data associated with a pending print job.

Command keys 330A–330D are mechanisms that allow a user to interact with summary window 340. In an embodiment of the invention, command keys 330A–D include an add command key 330A, a modify command key 330B, a delete command key 330C, and a delete all command key 330D. Add command key 330A is a mechanism that creates a pending print job using the print specification data currently specified in the configuration inputs 320A–320H. Modify command key 330B is a mechanism that allows a user to modify a pending print job. Delete command key 330C is a mechanism that allows a user to delete a pending print job. Delete all command key 330D is a mechanism that allows a user to delete all the pending print jobs.

Operation keys 350A–350C are mechanisms that allow the user to perform tasks not associated with a particular print job. In an embodiment of the invention, operation keys 350A–350C include a custom paper size operation key 350A, a help key 350B, and a restore defaults key 350C. Custom paper size operation key 350A is a mechanism that allows a user to configure a custom paper size. Help key 350B is a mechanism that allows a user to access one or more mechanisms designed to resolve user problems, e.g., a FAQ, support documents, etc. Restore defaults key 350C is a mechanism that allows a user to restore a default state of the graphical user interface 300.

Action keys 360A–360B are mechanisms that allow the user to perform actions associated with print jobs specified within summary window 340. In an embodiment, action keys 360A–360B include a print initiation action key 360A and a cancel action key 360B. Print initiation action key 360A is a mechanism that allows the user to initiate printing for each print job specified in the summary window 340. Cancel action key 360B is a mechanism that allows the user to cancel any action performed in response to receiving the print command.

Figure 3B:
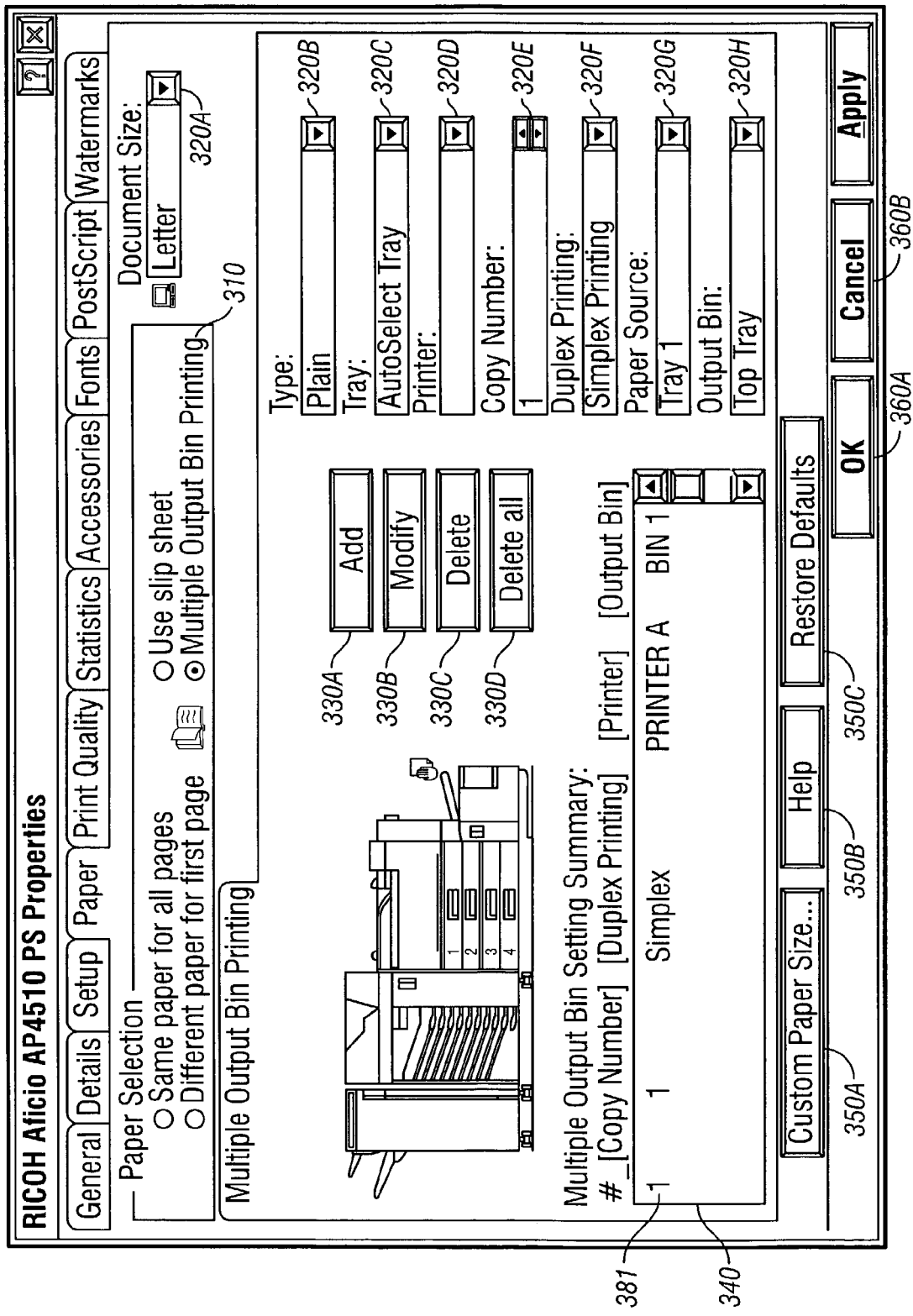
FIG. 3B is a second graphical illustration of a graphical user interface according to an embodiment of the invention.
Figure 3C:
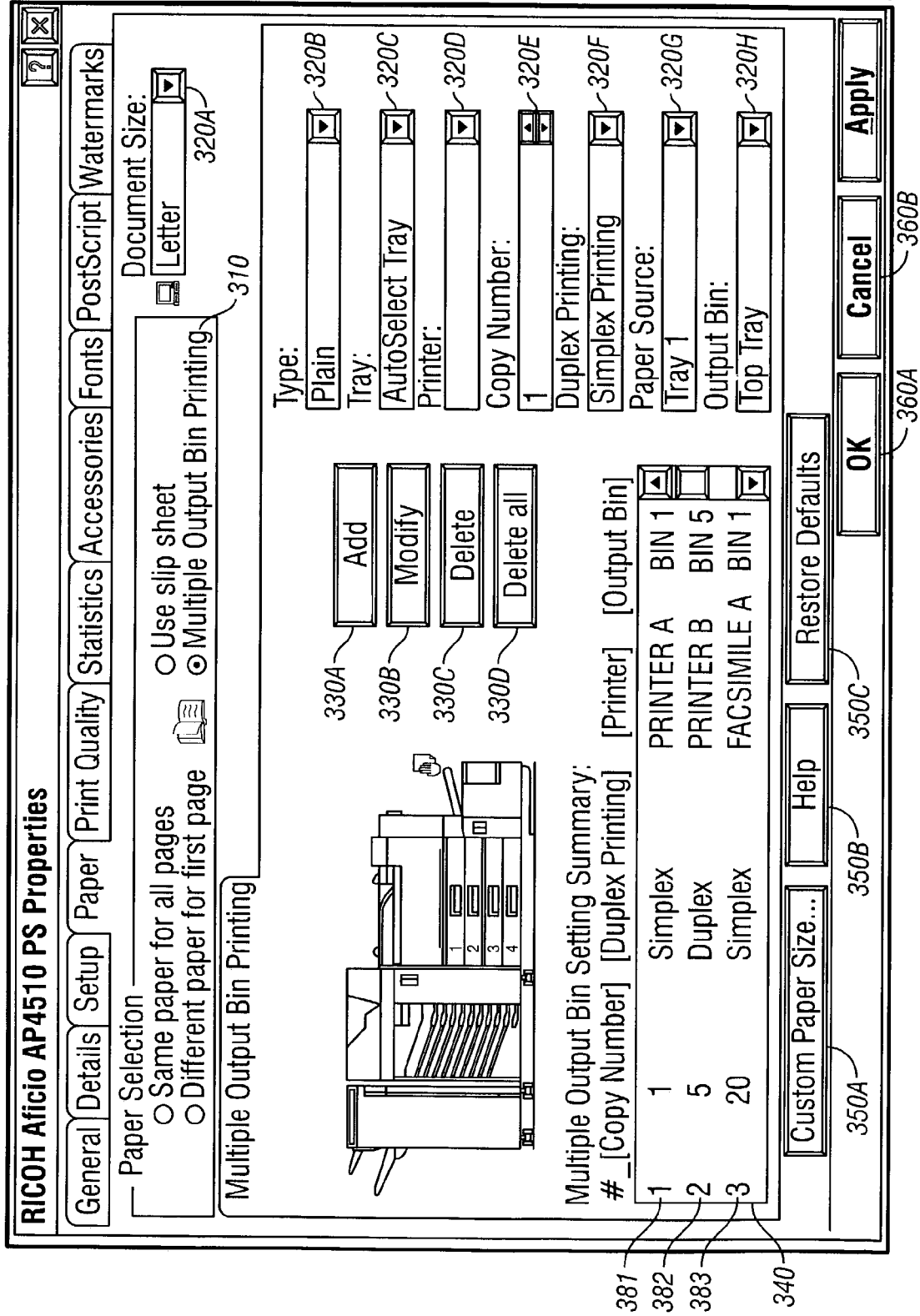
FIG. 3C is a third graphical illustration of a graphical user interface according to an embodiment of the invention.

An illustrative example of specifying three print jobs based on the same electronic document using graphical user interface 300 is now be presented with reference to FIGS. 3A, 3B, and 3C, which are graphical illustrations of graphical user interface 300 according to an embodiment of the invention. FIG. 3A depicts a graphical user interface 300 in which a user has previously selected multiple output mechanism printing selector 310, thereby displaying configuration inputs 320A–320H, command keys 330A–330D, summary window 340, and operation keys 350A–350C. A user specifies print specification data using configuration inputs 320A–320H, and thereafter selects add command key 330A to add a pending print job to the summary window 340. For example, summary window 340 shown in FIG. 3B depicts the state of a summary window 340 according to an embodiment after a user configured the configuration inputs 320A–320H to print one copy of an electronic document to printer A, output bin "1" using simplex printing, and subsequently selected the add command key 330A.

FIG. 3B depicts a pending print job 381 with the print specification data previously configured in the configuration inputs 320A–320H displayed in summary window 340 of graphical user interface 300.

After the user has added pending print job 381, the user may configure additional pending print jobs for the same electronic document. For example, FIG. 3C illustrates a graphical user interface 300 after a user has added pending print jobs 382 and 383. As shown in the summary window 340 in FIG. 3C, pending print job 382 comprises print specification data wherein five copies of the same electronic document to printer B, output bin "5" using duplex printing, and pending print job 383 comprises print specification data wherein twenty copies of the same electronic document to facsimile A, output bin "1" using simplex printing. Thus, graphical user interface 300 allows multiple copies of a single electronic document to be printed to multiple output mechanisms, where the output mechanisms may be different output bins of a single printer, or different output devices altogether.

Referring again to FIG. 2B, in step 216, print specification data is received from the user interface objects configured on graphical user interface 300. In an embodiment, graphical user interface 300 transmits all pending print jobs to printer driver 122 in response to the user selecting print initiation action key 360A. Each pending print job may have a unique set of print specification data. For example, if a user had selected the initiation action key 360A in FIG. 3C, then print specification data for each pending print jobs 381, 382, and 383 would be received in step 216.

In step 218, the printing of two or more copies of the electronic document to two or more output mechanisms is initiated. In an embodiment, printer driver 122 initiates the printing of one or more copies of the electronic document to two or more output mechanisms. The printing of an electronic document may be initiated by transmitting each print job listed in the summary window 340 to a printer associated with the output mechanism specified by the print specification data associated with the print job. For example, if print specification data for pending print jobs 381, 382, and 383 specified in the summary window 340 depicted in FIG. 3C was received in step 216, then in step 218, pending print job 381 is initiated at printer A, pending print job 382 is initiated at printer B, and pending print job 383 is initiated at facsimile A.

In an embodiment, in step 218, printer driver 122 initiates the printing of one or more copies of the electronic document to two or more output mechanisms using a compound print job. A compound print job is a print job comprising print specification data for two or more output mechanisms. Printer driver 122 may initiate the printing of one or more copies of the electronic document at an output mechanism by either transmitting the entire compound print job to the output mechanism, or by transmitting just the portion of the compound print job that is associated with the particular receiving output mechanism.

When each printer receives the print job, the printer prints out one or more copies of the electronic document in accordance with the print specification data contained within the print job to the specified output mechanism associated with the printer. Thus, in response to a single print command, multiple print jobs may be initiated, where each print job may be based on different print specification data, resulting in one or more copies of an electronic document to be printed to two or more output mechanisms.

In an embodiment, in step 218, the printing of one or more copies of the electronic document is initiated at facsimile machine 150. A print job is initiated at facsimile machine 150 by transmitting print specification data to a facsimile software application executing on client 120. In this context, a facsimile software application is any software application that is capable of receiving print specification data and initiating a facsimile using the print specification data. When the facsimile software application receives print specification data, the facsimile software application initiates transmission of a facsimile communication to the facsimile machine identified in the print specification data, in accordance with any other parameters specified in the print specification data.

In other embodiments of the invention, a status of one or more output mechanisms is displayed on the client 120 in step 220. The status of the output mechanisms communicated in step 220 may be any state that the output mechanism may currently be in. For example, the status of an output mechanism may indicate that the output mechanism is full, busy, or may not otherwise accommodate further printed copies of electronic documents. Other statuses of output mechanisms may also be communicated in step 220, e.g., everything is functioning normally, a printer associated with output mechanisms is running low on paper, or a printer associated with output mechanisms is experiencing technical difficulties.

In an embodiment, the status of an output mechanism is displayed through the graphical user interface 300. In another embodiment, the status of an output mechanism is displayed through a user interface displayed on client 120, e.g., through a software application responsible for initiating the print command received in step 212. Step 220 is optional, i.e., some embodiments of the invention may perform step 220, while other embodiments of the invention may not perform step 220.

Although flow-charts 200, 210 depict a particular set of steps in a particular order, other implementations may use fewer or more steps, in the same or different order, than those depicted in FIGS. 2A and 2B.

IV. Implementation Mechanisms

Figure 4:
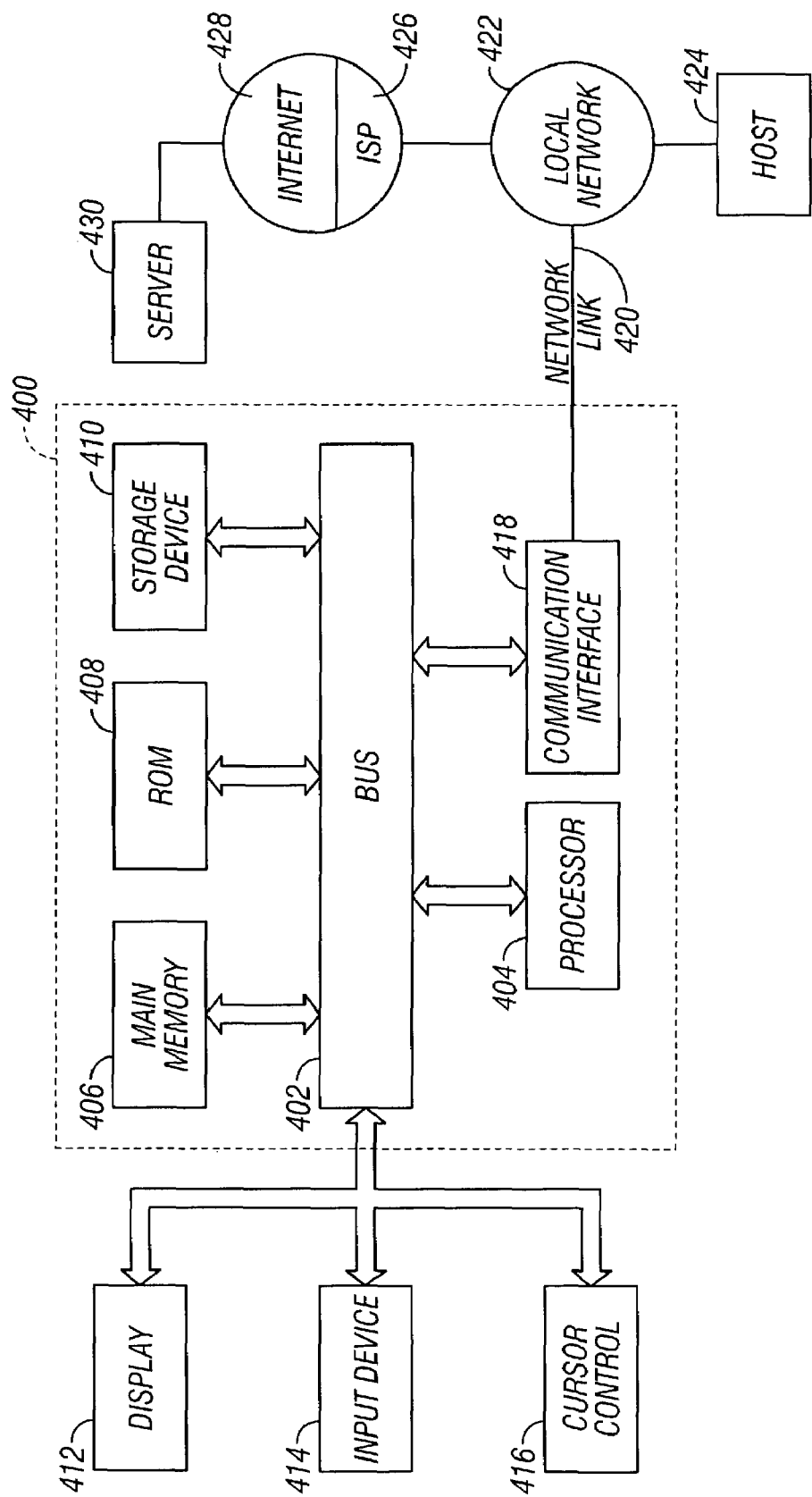
FIG. 4 is a block diagram that depicts a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, non-volatile memory chips, as well as optical and magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, non-volatile memory chips, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for printing an electronic document, comprising:

displaying one or more user interface objects on a graphical user interface, wherein the one or more user interface objects allow a user to configure print specification data, and wherein the print specification data specifies two or more output mechanisms, wherein the one or more user interface objects include a set of command keys that allow a user to interact with a summary window displayed on said graphical user interface, wherein said set of command keys include an add command key, a modify command key, and a delete command key, and wherein said summary window displays the print specification data on said graphical user interface, receiving the print specification data for the electronic document; and processing the print specification data to initiate printing of the electronic document to the two or more output mechanisms, wherein processing the print specification data includes creating a separate print job for each of the two or more output mechanisms, wherein a combination of each of the separate print jobs for each of the two or more output mechanisms is a compound print job, and wherein processing the print specification data comprises transmitting the same compound print job to each of the two or more output mechanisms, wherein the print specification data includes a first set of print attributes for a first output mechanism in the two or more output mechanisms and a second set of print attributes for a second output mechanism in the two or more output mechanisms, wherein the first set of print attributes is different from the second set of print attributes.

2. The method of claim 1, wherein at least one of the two or more output mechanisms is an output bin on a single bin printer.

3. The method of claim 1, wherein at least two of the two or more output mechanisms reside on different printing devices.

4. The method of claim 1, wherein each of the two or more output mechanisms comprises different output bins on a single multiple bin printer.

5. The method of claim 1, wherein at least one of the two or more output mechanisms is a facsimile machine.

6. The method of claim 1, wherein the first set of print attributes and the second set of print attributes are dissimilar to each other with respect to stapling, size of paper, type of paper, color of ink, orientation, simplex printing, duplex printing, or number of copies.

7. The method of claim 1, further comprising: notifying a user of a status of one of the two or more output mechanisms.

8. The method of claim 7, wherein the status indicates that one of the two or more output mechanisms is unable to receive additional copies of the electronic document.

9. The method of claim 1, wherein the print specification data further specifies that each of the two or more output mechanisms is to receive at least one printed copy of the electronic document.

10. A computer-implemented method for printing an electronic document, comprising:

displaying one or more user interface objects on a graphical user interface, wherein the one or more user interface objects allow a user to configure print specification data, and wherein the print specification data specifies two or more output mechanisms to each receive at least a portion of a printed copy of the electronic document, wherein the one or more user interface objects include a set of command keys that allow a user to interact with a summary window displayed on said graphical user interface, wherein said set of command keys include an add command key, a modify command key, and a delete command key, and wherein said summary window displays the print specification data on said graphical user interface, receiving the print specification data for the electronic document; and processing the print specification data to initiate printing of the electronic document to the two or more output mechanisms, wherein processing the print specification data includes creating a separate print job for each of the two or more output mechanisms, wherein a combination of each of the separate print jobs for each of the two or more output mechanisms is a compound print job, and wherein processing the print specification data comprises transmitting the same compound print job to each of the two or more output mechanisms, wherein the print specification data includes a first set of print attributes for a first output mechanism in the two or more output mechanisms and a second set of print attributes for a second output mechanism in the two or more output mechanisms, wherein the first set of print attributes is different from the second set of print attributes.

11. A computer-readable medium carrying one or more instructions for printing an electronic document, wherein execution of the one or more sequences of instructions by one or more processors causes the performance of:

displaying one or more user interface objects on a graphical user interface, wherein the one or more user interface objects allow a user to configure print specification data, and wherein the print specification data specifies two or more output mechanisms, wherein the one or more user interface objects include a set of command keys that allow a user to interact with a summary window displayed on said graphical user interface, wherein said set of command keys include an add command key, a modify command key, and a delete command key, and wherein said summary window displays the print specification data on said graphical user interface, receiving the print specification data for the electronic document; and processing the print specification data to initiate printing of the electronic document to the two or more output mechanisms, wherein processing the print specification data includes creating a separate print job for each of the two or more output mechanisms, wherein a combination of each of the separate print jobs for each of the two or more output mechanisms is a compound print job, and wherein processing the print specification data comprises transmitting the same compound print job to each of the two or more output mechanisms, wherein the print specification data includes a first set of print attributes for a first output mechanism in the two or more output mechanisms and a second set of print attributes for a second output mechanism in the two or more output mechanisms, wherein the first set of print attributes is different from the second set of print attributes.

12. The computer-readable medium of claim 11, wherein at least one of the two or more output mechanisms is an output bin on a printer.

13. The computer-readable medium of claim 11, wherein at least one of the two or more output mechanisms is a printer.

14. The computer-readable medium of claim 11, wherein the two or more output mechanisms comprise at least two output bins on a single printer.

15. The computer-readable medium of claim 11, wherein at least one of the two or more output mechanisms is a facsimile machine.

16. The computer-readable medium of claim 15, wherein the first set of print attributes and the second set of print attributes are dissimilar to each other with respect to stapling, size of paper, type of paper, color of ink, orientation, simplex printing, duplex printing, or number of copies.

17. The computer-readable medium of claim 11, wherein execution of the one or more sequences of instructions by one or more processors further causes notifying a user of a status of one member in the two or more output mechanisms.

18. The computer-readable medium of claim 17, wherein the status indicates that one of the two or more output mechanisms is unable to receive additional copies of the electronic document.

19. The computer-readable medium of claim 11, wherein the print specification data further specifies that each of the two or more output mechanisms is to receive at least one printed copy of the electronic document.

20. A computer-readable medium carrying one or more instructions for printing an electronic document, wherein execution of the one or more sequences of instructions by one or more processors causes the performance of:
   displaying one or more user interface objects on a graphical user interface, wherein the one or more user interface objects allow a user to configure print specification data, and wherein the print specification data specifies two or more output mechanisms to each receive at least a portion of a printed copy of the electronic document, wherein the one or more user interface objects include a set of command keys that allow a user to interact with a summary window displayed on said graphical user interface, wherein said set of command keys include an add command key, a modify command key, and a delete command key, and wherein said summary window displays the print specification data on said graphical user interface,
   receiving the print specification data for the electronic document; and
   processing the print specification data to initiate printing of the electronic document to the two or more output mechanisms,
   wherein processing the print specification data includes creating a separate print job for each of the two or more output mechanisms, wherein a combination of each of the separate print jobs for each of the two or more output mechanisms is a compound print job, and wherein processing the print specification data comprises transmitting the same compound print job to each of the two or more output mechanisms,
wherein the print specification data includes a first set of print attributes for a first output mechanism in the two or more output mechanisms and a second set of print attributes for a second output mechanism in the two or more output mechanisms, wherein the first set of print attributes is different from the second set of print attributes.

21. An apparatus for printing an electronic document, comprising:
   means for displaying one or more user interface objects on a graphical user interface, wherein the one or more user interface objects allow a user to configure print specification data, and wherein the print specification data specifies two or more output mechanisms,
   wherein the one or more user interface objects include a set of command keys that allow a user to interact with a summary window displayed on said graphical user interface, wherein said set of command keys include an add command key, a modify command key, and a delete command key, and wherein said summary window displays the print specification data on said graphical user interface,
   means for receiving the print specification data for the electronic document; and
   means for processing the print specification data to initiate printing of the electronic document to the two or more output mechanisms,
   wherein the means for processing the print specification data includes means for creating a separate print job for each of the two or more output mechanisms, wherein a combination of each of the separate print jobs for each of the two or more output mechanisms is a compound print job, and wherein the means for processing the print specification data comprises means for transmitting the same compound print job to each of the two or more output mechanisms,
wherein the print specification data includes a first set of print attributes for a first output mechanism in the two or more output mechanisms and a second set of print attributes for a second output mechanism in the two or more output mechanisms, wherein the first set of print attributes is different from the second set of print attributes.

22. The apparatus of claim 21, wherein at least one of the two or more output mechanisms is an output bin on a printer.

23. The apparatus of claim 21, wherein at least one of the two or more output mechanisms is a printer.

24. The apparatus of claim 21, wherein the two or more output mechanisms bins comprise at least two output bins on a single printer.

25. The apparatus of claim 21, wherein at least one of the two or more output mechanisms is a facsimile machine.

26. The apparatus of claim 21, wherein the first set of print attributes and the second set of print attributes are dissimilar to each other with respect to stapling, size of paper, type of paper, color of ink, orientation, simplex printing, duplex printing, or number of copies.

27. The apparatus of claim 21, further comprising means for notifying a user of a status of one of the two or more output mechanisms.

28. The apparatus of claim 27, wherein the status indicates that one of the two or more output mechanisms is unable to receive additional copies of the electronic document.

29. The apparatus of claim 21, wherein the print specification data further specifies that each of the two or more output mechanisms is to receive at least one printed copy of the electronic document.

30. An apparatus for printing an electronic document, comprising:
   means for displaying one or more user interface objects on a graphical user interface, wherein the one or more user interface objects allow a user to configure print specification data, and wherein the print specification data specifies two or more output mechanisms to each receive at least a portion of a printed copy of the electronic document,
   wherein the one or more user interface objects include a set of command keys that allow a user to interact with a summary window displayed on said graphical user interface, wherein said set of command keys include an add command key, a modify command key, and a delete command key, and wherein said summary window displays the print specification data on said graphical user interface,
   means for receiving the print specification data for the electronic document; and
   means for processing the print specification data to initiate printing of the electronic document to the two or more output mechanisms,
   wherein the means for processing the print specification data includes means for creating a separate print job for each of the two or more output mechanisms, wherein a combination of each of the separate print jobs for each of the two or more output mechanisms is a compound print job, and wherein the means for processing the print specification data comprises means for transmitting the same compound print job to each of the two or more output mechanisms, wherein the print specification data includes a first set of print attributes for a first output mechanism in the two or more output mechanisms and a second set of print attributes for a second output mechanism in the two or more output mechanisms, wherein the first set of print attributes is different from the second set of print attributes.

31. An apparatus for printing an electronic document, comprising:

a processor; and a computer-readable medium accessible to the processor and comprising one or more sequences of instructions which, when executed by the processor, cause the processor to perform:

displaying one or more user interface objects on a graphical user interface, wherein the one or more user interface objects allow a user to configure print specification data, and wherein the print specification data specifies two or more output mechanisms, wherein the one or more user interface objects include a set of command keys that allow a user to interact with a summary window displayed on said graphical user interface, wherein said set of command keys include an add command key, a modify command key, and a delete command key, and wherein said summary window displays the print specification data on said graphical user interface, receiving the print specification data for the electronic document; and processing the print specification data to initiate printing of the electronic document to the two or more output mechanisms, wherein processing the print specification data includes creating a separate print job for each of the two or more output mechanisms, wherein a combination of each of the separate print jobs for each of the two or more output mechanisms is a compound print job, and wherein processing the print specification data comprises transmitting the same compound print job to each of the two or more output mechanisms, wherein the print specification data includes a first set of print attributes for a first output mechanism in the two or more output mechanisms and a second set of print attributes for a second output mechanism in the two or more output mechanisms, wherein the first set of print attributes is different from the second set of print attributes.

32. The apparatus of claim 31, wherein at least one of the two or more output mechanisms is an output bin on a printer.

33. The apparatus of claim 31, wherein at least one of the two or more output mechanisms is a printer.

34. The apparatus of claim 31, wherein the two or more mechanisms bins comprise at least two output bins on a single printer.

35. The apparatus of claim 31, wherein at least one of the two or more output mechanisms is a facsimile machine.

36. The apparatus of claim 31, wherein the first set of print attributes and the second set of print attributes are dissimilar to each other with respect to stapling, size of paper, type of paper, color of ink, orientation, simplex printing, duplex printing, or number of copies.

37. The apparatus of claim 31, wherein execution of the one or more sequences of instructions by one or more processors further causes the one or more processors to perform: notifying a user of a status of one of the two or more output mechanisms.

38. The apparatus of claim 37, wherein the status indicates the one of the two or more output mechanisms is unable to receive additional copies of the electronic document.

39. The apparatus of claim 31, wherein the print specification data further specifies that each of the two or more output mechanisms is to receive at least one printed copy of the electronic document.

40. An apparatus for printing an electronic document, comprising:

a processor; and a computer-readable medium accessible to the processor and comprising one or more sequences of instructions which, when executed by the processor, cause the processor to perform:

displaying one or more user interface objects on a graphical user interface, wherein the one or more user interface objects allow a user to configure print specification data, and wherein the print specification data specifies two or more output mechanisms to each receive at least a portion of a printed copy of the electronic document, wherein the one or more user interface objects include a set of command keys that allow a user to interact with a summary window displayed on said graphical user interface, wherein said set of command keys include an add command key, a modify command key, and a delete command key, and wherein said summary window displays the print specification data on said graphical user interface, receiving the print specification data for the electronic document; and processing the print specification data to initiate printing of the electronic document to the two or more output mechanisms, wherein processing the print specification data includes creating a separate print job for each of the two or more output mechanisms, wherein a combination of each of the separate print jobs for each of the two or more output mechanisms is a compound print job, and wherein processing the print specification data comprises transmitting the same compound print job to each of the two or more output mechanisms, wherein the print specification data includes a first set of print attributes for a first output mechanism in the two or more output mechanisms and a second set of print attributes for a second output mechanism in the two or more output mechanisms, wherein the first set of print attributes is different from the second set of print attributes.

* * * * *